United States Patent [19]
Lukomskyj et al.

[11] 3,934,615
[45] Jan. 27, 1976

[54] SEGMENTED RIGID INSULATED CONDUIT

[76] Inventors: Paul Lukomskyj, 14386 Park Drive; Donald James Gamble, Apt. 4, 11229 - 99 Ave., both of Edmonton, Alberta, Canada

[22] Filed: Apr. 8, 1974

[21] Appl. No.: 458,671

[52] U.S. Cl. ............ 138/111; 138/149; 138/158
[51] Int. Cl.² ............................................ F16L 9/18
[58] Field of Search ........... 138/115, 111, 117, 149, 138/177, 157–163; 174/95–97; 285/47

[56] References Cited
UNITED STATES PATENTS

| | | | |
|---|---|---|---|
| 1,208,884 | 12/1916 | Abbott | 138/158 X |
| 1,959,302 | 5/1934 | Paige | 138/149 X |
| 2,532,587 | 12/1950 | Williamson | 138/149 |
| 2,650,180 | 8/1953 | Walker | 138/158 X |
| 3,078,202 | 2/1963 | Bellanca et al. | 138/117 X |
| 3,151,633 | 10/1964 | Shuman | 138/111 X |

FOREIGN PATENTS OR APPLICATIONS

| | | | |
|---|---|---|---|
| 1,075,052 | 2/1960 | Germany | 138/149 |
| 573,041 | 3/1959 | Canada | 138/149 |
| 575,356 | 4/1933 | Germany | 174/96 |

*Primary Examiner*—John W. Huckert
*Assistant Examiner*—Charles Gorenstein
*Attorney, Agent, or Firm*—Ernest Peter Johnson

[57] ABSTRACT

This invention discloses an insulated, longitudinally segmented, rigid conduit containing several pipes of varying sizes. The conduit comprises any number of separate pipe carrying segments wherein the rigid casing, the rigid insulation, and the pipe constitute integral parts of these segments providing rigidity to them. The invention discloses multiple unit conduits and a single unit suitable for use as a conduit by itself, which can be attached to similar units or to other surfaces such as floors, walls or ceilings. The conduit is designed to withstand external bending and shear stresses and internal fluid pressures.

6 Claims, 6 Drawing Figures

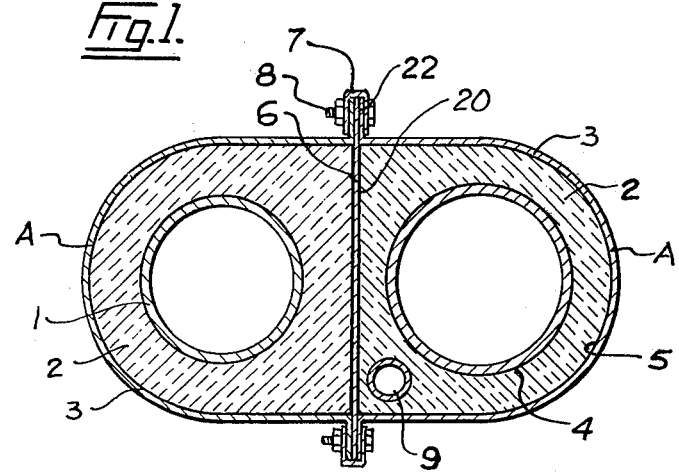
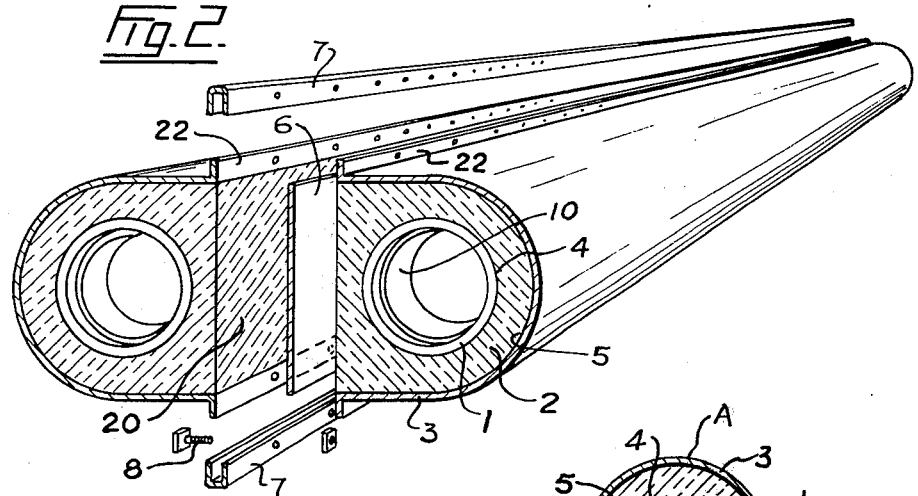
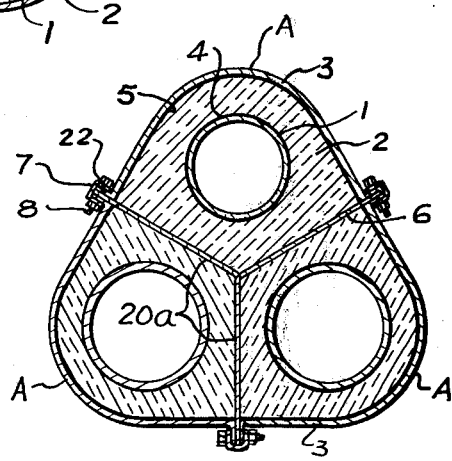
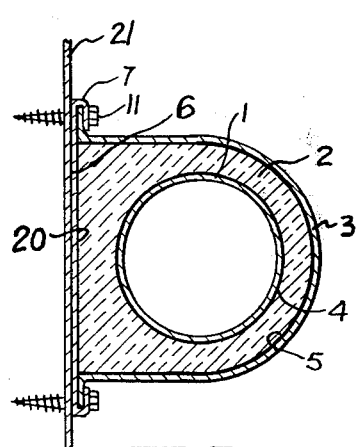

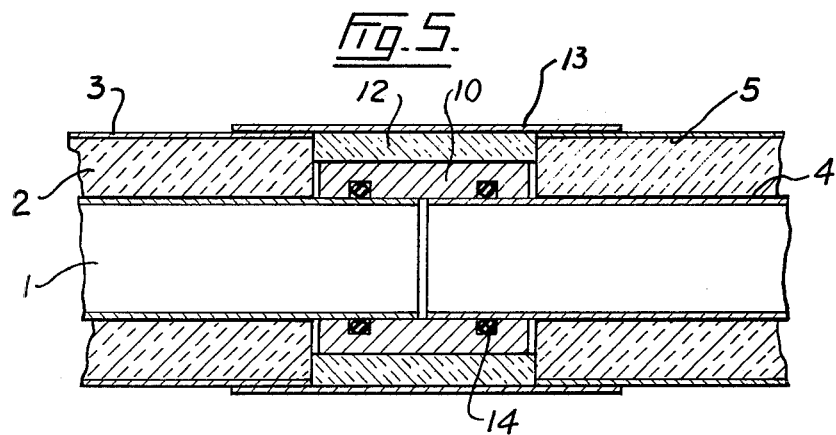
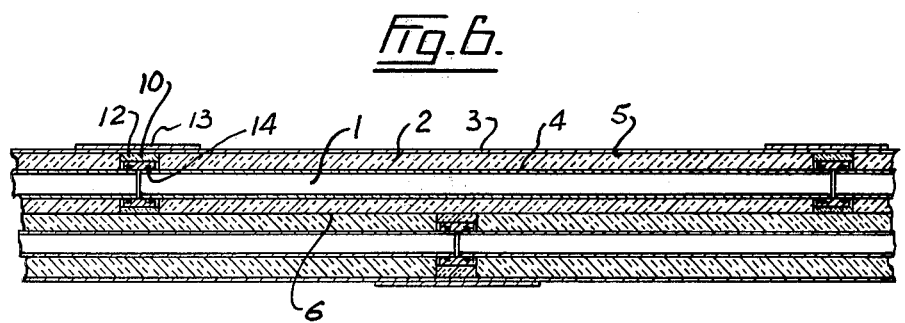

SEGMENTED RIGID INSULATED CONDUIT

FIELD OF THE INVENTION

This invention pertains to rigid, insulated piping conduits for carrying fluids, and it particularly relates to conduits containing any desired number of pipes of variable diameters located within the conduit. Conduits of similar type find their applications in conveyance of freezable fluids, such as water, at below freezing surrounding temperatures. When such conduits are used for municipal utility systems, several pipes are required within one conduit to carry raw water, sewage, treated water, steam, etc. In the cold regions where the soil is permanently frozen, these conduits allow installation and operation of utility systems. The same type of conduits are also utilized for conveyance of chilled fluids which have to be protected from gaining heat from the surroundings.

BACKGROUND OF THE INVENTION

To convey fluids which are subject to undesirable cooling (or heating), several types of insulated conduits have previously been devised. For protection of single pipes, conduits have been fabricated utilizing the pipe-within-a-pipe concept where a carrier pipe is located within a casing pipe and where the annular space between them is filled with insulation, such as glass fiber or rigid foam. Although some attempts have been made to install more than one pipe within a single exterior casing pipe, the more common approach to multiple pipe conduits is to fabricate a conduit in which the casing consists of a long box and the pipes are laid within it and are not directly insulated. To provide thermal protection to the pipes, these conduit boxes are filled with various types of loose fiber or granulated insulation. In instances where periodic access to the pipes is required, the walls of the conduit box are adequately insulated instead of using loose insulation fill, thus allowing the pipes to remain bare, and a removable side or top of the conduit box provides access to the pipes.

The object of all thermally insulated conduits is to minimize heat transfer by provision of an adequate thickness of insulation while keeping the exterior surface area of the conduit at a minimum, since both the thicker insulation and the smaller surface area reduce the rate of heat transfer. In this respect, for a single carrier pipe, the pipe-within-a-pipe design provides the most efficient thermal design. However, when two or more fluid carrying pipes are installed within one casing pipe it becomes practically difficult or impossible to gain access to any of the individual fluid carrying pipes. Although thermally fairly efficient, this design, containing several pipes, is usually impractical. The alternate approach, involving insulation of individual pipes separately, requires more insulation and increases the external surface area considerably, making it thermally inefficient and less economical. The insulated box-type designs, which are the most common, achieve various degrees of efficiency depending on the cross-section of the box and the amount and type of insulation used, but they all are thermally less efficient than the pipe-within-a-pipe design. However, these box-type designs are more practical to install and to operate.

All these insulated conduits contain four basic functional components: fluid carrying pipes, thermal insulation, structural members, and protective cladding. In the box-type conduits all these components are separate and distinct, while in the pipe-within-a-pipe design the exterior pipe provides structural stability as well as acting as a protective cladding. In all designs economies are achieved by aiming at the most compact configuration of the conduit using small volumes of efficient insulation and reducing the size and number of structural members. Cladding is usually reduced in proportion to the other components and reduction of pipe diameter is only possible where the pipe material offers better flow characteristics.

Insulated conduits such as those used for municipal utility systems in the Arctic are installed above ground on supporting foundations such as piles. Spacing of the supports depends on the rigidity and strength of the conduit. Conduits which are structurally efficient allow longer spans to be used, thereby reducing the cost of supporting foundations. Therefore one of the criteria used in conduit design is the beam strength of the structure. In practise this beam strength is incorporated into the framework of the box, or it is provided by installation of longitudinal beams located beneath the box.

Most conduits of the types described have lent themselves to a very limited amount of component prefabrication which results in considerable labour requirements during on-site erection. Consequently the need for increased use of pre-fabrication has been felt for some time, particularly in remote regions where labour costs are high.

SUMMARY OF THE INVENTION

In accordance with this invention, a piping conduit is provided comprising discrete, longitudinal segments disengagably connected together to form a rigid unit. Each segment comprises one or more rigid conveyor pipes encased in a body of rigid insulating material. The body of insulating material has one or more shaped longitudinal surface sections - these sections are usually flat in configuration. A rigid cladding or casing encases each body of insulating material, except for the shaped surface sections which may be totally uncovered. The segments are brought together so that the shaped, surface sections of adjoining bodies of insulating material mate to form a compact assembly. The casing segments are rigidly secured together, as with bolts and nuts or the like, to form a rigid unit.

In a preferred form of the invention, the conveyor pipe is placed in, but spaced from, a trough-like casing segment. Insulating material, such as polyurethane foam, is then poured into the trough. When the polyurethane foam has set, the three elements of the segment are bonded together to provide a rigid unit.

The insulated, multiple pipe conduit invention is structurally compact and thermally efficient. It overcomes the difficulty of access to or removal of individual pipes, which is an inherent problem in conduits having several carrier pipes installed in a common casing pipe.

The design as disclosed allows the use of the pipe, the casing, and the insulation as integral structural components of the conduit making the conduit self-supporting. By varying the cross-sectional dimensions of the casing, varying proportions of the internal and external loads may be transferred to the pipe or to the insulation. By bonding the insulation to the casing and to the pipe the conduit effectively becomes a composite beam which may be designed to span required distances between supports or to withstand anticipated superimposed loads.

In the disclosed conduit design the heat loss is minimized by minimizing the exposed surface area, since the casing is shaped to suit the carrier pipes. The shape of the casing also reduces the volume of insulation required compared to box-type conduits carrying uninsulated pipes, or to uninsulated conduits individually insulated pipes. In addition, reduction of heat losses by reduction of surface area allows an overall reduction in insulation thickness, and hence volume.

The longitudinal segmentation of the conduit is a feature which overcomes the problem of access to or removal of individual pipes associated with pipe-within-a-pipe designs. Separate segments allow continued operation of the other pipes within the conduit while one pipe is being repaired. In this instance the other pipes are not in danger of being exposed to adverse external temperatures as they would be in most box-type structures. The segmented design also allows staggering of joints of the individual pipes which avoids possible contamination and adds structural stability to the structure. In pipe-within-a-pipe designs, staggering of joints is not practically possible, and box-type conduits are susceptible to contamination in the event of joint failure of one of the pipes, such as one carrying sewage. A segmented conduit with staggered joints greatly reduces or virtually eliminates contamination due to joint failure by effectively isolating individual joints and making spillage to the outside possible rather than towards the joint on the adjacent pipe.

The split casing feature also allows simple fabrication procedures in the process of placing insulation. The insulation is placed from the side into a trough-shaped casing, rather than from the end into a round pipe.

DESCRIPTION OF THE DRAWING

In the drawing:

FIG. 1 shows a cross-section of a conduit having two segments separated by a divider;

FIG. 2 is an isometric view, partially exploded, of the embodiment shown in FIG. 1;

FIG. 3 shows a cross-section of a single segment in accordance with the invention;

FIG. 4 shows a cross-section of a three segment conduit;

FIG. 5 shows a longitudinal section of a joint joining two conduit segments; and FIG. 6 shows a longitudinal section having a series of conduit segments with staggered pipe joints.

DESCRIPTION OF THE PREFERRED EMBODIMENT

With reference to FIG. 1, there is shown a piping conduit having two segments A. Each segment A comprises a conveyor pipe 1 imbedded in a body 2 of rigid insulation, which is encased in and protected by rigid, exterior casing segment 3. As illustrated in the right hand segment A shown in FIG. 1, additional conveyor pipes, such as pipe 9, may be included in the segment. The conveyor pipes 1, 9 are spaced from each other and from the casing segment 3, and the insulation extends along and about each of the pipes 1, 9.

To add rigidity to the assembly, the body 2 of insulation may be bonded to the casing segment 3 and contained conveyor pipes 1, 9. We prefer to use polyurethane foam to insulate, and glass fibre-reinforced plastic for the casing and pipes — the foam is self-bonding to the outer surface 4 of the conveyor pipe and the inner surface 5 of the casing segment.

It will be noted that each body 2 has a shaped longitudinal surface section 20 which is adapted to mate with a corresponding section on the adjoining segment or some other surface, such as the wall 21 shown in FIG. 3. In the three segment embodiment shown in FIG. 4, each body 2 is formed with an unencased surface section having two faces 20a.

A divider 6 may be placed between two segments A to function as a structural stiffener and isolating membrane for protection against contamination.

The casing segments 3 are disengagably connected to each other using means such as bolts 8 which pass through channels 7, flanges 22 and dividers 6.

Each conduit is provided with means at each of its ends for connecting it to other conduits in end-to-end relationship to form a pipeline of the desired length for fluid transmission. One means for connecting segments in end-to-end relation is shown in FIGS. 5 and 6. In this instance, the pipe 1 protrudes from the insulation body 2 sufficiently to allow the coupling 10 to be installed in an exposed position. In this illustration, a sleeve-type coupling with rubber ring seals 14 is shown. Pre-cut or pre-formed pieces of insulation 12 fit around the coupling to fill the space and to protect the coupling. Protection of this insulation is provided by a sleeve 13 which is made of the same material as the casing segments 3, and fits over them. As shown in FIG. 6, a series of independent piping conduit units may be assembled with the pipe joints staggered to provide rigidity to the entire assembly and to prevent contamination of fluids between joints.

To assemble the piping conduit, the casing segment 3, made of steel plate or sheet, is positioned with its longitudinal opening facing upward, so as to form a trough. The conveyor pipe 1, made of fiberglass reinforced plastic or other suitable material, is positioned and fastened within the casing segment, to the required tolerance. The two ends of the casing segment are then covered by means of bulkheads to prevent spillage of insulation. Subsequently polyurethane foam chemicals are injected into the assembly and they react to fill the space between the conveyor pipe and the casing segment with foam. The foam may be formed to any desired thickness above the longitudinal opening in the casing. As the polyurethane insulation foam forms, it will bond to the steel casing and to the fiberglass reinforced pipe. After the insulation becomes rigid, the exposed side can be cut to form a surface 20 suitable for mating with a similar unit or any other surface. The mating surface may also be formed by placing a suitable mold against the insulation foam during the reaction period and allowing it to expand against the mold. In this case, cutting is not required since the mold shapes the mating surface.

Obvious variations in the specific constructional details described may be made without departing from the spirit of the invention and such embodiments of the invention as come within the scope and purview of the appended claims are to be considered as part of this invention.

What is claimed is:

1. A longitudinally-segmented, insulated piping conduit comprising:

a plurality of spaced apart, substantially rigid conveyor pipes;

a plurality of discrete bodies of substantially rigid insulating material, each said body extending around and along the outer surface of a conveyor pipe, for insulating said conveyor pipe;

each said body having a shaped longitudinal surface section mating with a corresponding surface section of another body;

a rigid casing segment encasing each body except its shaped longitudinal surface sections; and means disengagably connecting together the casing segments, whereby the bodies are protectively encased with their surface sections mated in longitudinal engagement.

2. The piping conduit as set forth in claim 1 wherein: each body of insulating material is bonded to its conveyor pipe and casing segment to form an integral unit.

3. The piping conduit as set forth in claim 2 wherein: rigid longitudinal divider members are inserted between the integral units.

4. The piping conduit as set forth in claim 1 comprising:
means at each end of the conduit for connecting it to other conduits in end-to-end relationship for fluid transmission.

5. The piping conduit as set forth in claim 2 comprising:
means at each end of the conduit for connecting it to other conduits in end-to-end relationship for fluid transmission.

6. The piping conduit as set forth in claim 2 wherein: adjoining conduit segments each comprising a conveyor pipe body of insulating material, and casing segment, are of different lengths whereby their ends are in staggered relation.

* * * * *